United States Patent Office 3,514,447
Patented May 26, 1970

3,514,447
BIS-DIAZIRINES
Robert Fitz Randolph Church, Riverside, Conn., and Martin Joseph Weiss, Oradell, N.J., assignors to American Cyanamid Company, Stamford, Conn., a corporation of Maine
No Drawing. Filed Dec. 30, 1966, Ser. No. 605,983
Int. Cl. C07d 45/00, 51/34, 51/70
U.S. Cl. 260—239        4 Claims

ABSTRACT OF THE DISCLOSURE

The reaction of 4,4-azoalkanoyl chlorides with hydrazine hydrate, piperazine or 2-aminopyrimidine to produce novel diazirine compounds, is described. The latter compounds are useful as diuretic, hypoglycemic, muscle relaxant or hypotensive agents.

This invention relates to novel diazirine compounds. More particularly, the invention relates to novel bis azo substituted compounds which may be illustrated by the following general formula:

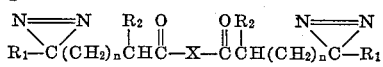

wherein $R_1$ is lower alkyl; $R_2$ is hydrogen or mononuclear aryl; X is hydrazo, piperazine-1,4-diyl, lower alkyl piperazine-1,4-diyl, phenylenediimino, lower alkylene, diimino, lower alkylenedioxy or 2(1H)-pyrimidinylidine and $n$ is 0, 1 or 2.

The novel compounds of the present invention may be prepared by reacting an acid halide which can be represented by the following general formula:

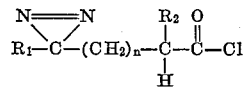

wherein $R_1$, $R_2$ and $n$ are as defined above, with a diamino or a dihydroxy compound, such as, for example, ethylenediamine, phenylenediamine, ethylene glycol, etc. The acid halides themselves may be prepared by methods described herein and in our copending application Ser. No. 606,017 filed Dec. 30, 1969.

The reaction is carried out in the presence of alkali preferably a teritary aliphatic amine, to remove the formed hydrogen chloride. The products may be isolated and purified using conventional procedures familiar to those skilled in the art.

The novel compounds of this invention are either liquids or crystalline or wax-like solids. The compounds generally are soluble in the more common organic solvents, as for example, ethanol, acetone, petroleum ether and the like. The presence of the diazirine group may be confirmed by the characteristic absorption shown by the compounds in the ultraviolet spectrum at 345–365 mμ and in the infrared spectrum at 6.3μ.

The novel compounds of the present invention exhibit diuretic, hypotensive, hypoglycemic, and muscle relaxant activity in warm-blooded animals and as such, may be useful as therapeutic agents in the treatment of edema, hypertension, hyperglycemia, and mental depression, and the like.

The following examples illustrate the preparation of representative diazirine compounds of the present invention.

EXAMPLE 1

Preparation of N,N'-bis-(4,4-azopentanoyl)hydrazide

A solution of 1.51 g. of hydrazine hydrate and 10 ml. triethylamine in 300 ml. benzene is cooled to 5° C. and a solution of 11 g. 4,4-azopentanoyl chloride in 40 ml. benzene is added with good stirring and cooling. The resultant mixture is stirred several hours and filtered. The precipitate is washed with water, then recrystallized from acetone to give the product as fine white needles, melting point 150.5–152° C.

The compound of this example is a diuretic and in addition shows hypoglycemic properties.

EXAMPLE 2

Preparation of N,N'-bis-(4,4-azopentanoylamino)-benzene

A solution of 1.321 g. p-phenylenediamine and 4.0 ml. triethylamine in 50 ml. dry benzene is cooled to 5° C. and 3.6 g. 4,4-azopentanoyl chloride in 20 ml. benzene is added dropwise with cooling. The mixture is stirred 20 hours at 25° then diluted with 100 ml. 1 N hydrochloric acid and 100 ml. methylene chloride. The precipitated solid is filtered off and recrystallized from acetone to give the product, melting point 208–210°.

EXAMPLE 3

Preparation of N,N'-bis-(4,4-azopentanoyl)piperazine

A solution of 5 ml. triethylamine and 1.04 g. piperazine in 35 ml. dry benzene is stirred in ice and a solution of 3.2 g. 4,4-azopentanoyl chloride in 20 ml. benzene is added over a five minute period. The resulting mixtfure is stirred at room temperature for 16 hours, extracted with three 20 ml. portions of 2 N hydrochloric acid, once with saturated aqueous sodium bicarbonate and once with brine. The solution is dried over magnesium sulfate, and the solvent is removed at reduced pressure. The crystalline residue is recrystallized from benzene-hexane to give white crystals, melting point 83.5–84° C.

The compound of this example is active as a muscle relaxant.

EXAMPLE 4

Preparation of N,N'-bis(4,4-azopentanoyl)-2-methyl-piperazine

Using the procedure of Example 3, N,N'-bis(4,4-azopentanoyl)-2-methylpiperazine is prepared from 2-methylpiperazine and 4,4-azopentanoyl chloride.

EXAMPLE 5

Preparation of N,N'-bis(4,4-azo-2-phenyl-pentanoyl)ethylene diamine

Using the procedure of Example 3, N,N'-bis-(4,4-azo-2-phenylpentanoyl)-ethylene diamine, melting point 120–121° C., is prepared from 4,4-azo-2-phenylpentanoyl chloride and ethylene diamine.

EXAMPLE 6

Preparation of ethylene-1,2-bis-5,5-azohexanoate

Using the method of Example 3, ethylene-1,2-bis-5,5-azohexanoate is prepared from ethylene glycol and 5,5-azohexanoyl chloride.

EXAMPLE 7

Preparation of N-[1-(4,4 - azopentanoyl)-2(1H)-pyrimidinylidene]-4,4-azopentanamide To a well stirred solution of 1.70 g. of 2-aminopyrimidine and 7 ml. of triethylamine in 50 ml. of chloroform is added dropwise a solution of 2.60 g. of 4,4-azopentanoyl chloride in 20 ml. of chloroform. The mixture is stirred 15 minutes and washed consecutively with 20 ml. portions each of 5 N sodium hydroxide, water (three times) and brine. The organic portion is dried over magnesium sulfate and the solvent is removed at reduced pressure. The crystalline residue is recrystallized from ethyl acetate-hexane to yield the product with melting point 62–63° C.

The compound of this example exhibits hypotensive properties.

What is claimed is:

1. A compound of the formula:

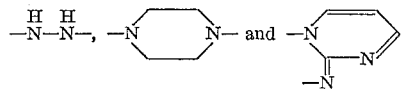

wherein $R_1$ is lower alkyl and X is selected from the group consisting of

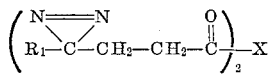

2. The compound according to claim 1; N,N'-bis-(4,4-azopentanoyl)hydrazide.

3. The compound according to claim 1; N,N'-bis-(4,4-azopentanoyl)piperazine.

4. The compound according to claim 1; N-[1-(4,4-azopentanoyl) - 2(1H) - pyrimidinylidene]4,4-azopentanamide.

References Cited

UNITED STATES PATENTS 3,345,369    10/1967    Sassiver et al. _____ 260—243

ALTON D. ROLLINS, Primary Examiner

U.S. Cl. X.R.

260—256.4, 268, 999